United States Patent
Laidley et al.

(10) Patent No.: US 9,714,726 B1
(45) Date of Patent: Jul. 25, 2017

(54) ADJUSTABLE PIPE STAND

(71) Applicant: Big Elk Energy Systems, LLC, Tulsa, OK (US)

(72) Inventors: John Laidley, Tulsa, OK (US); Dennis McClintock, Tulsa, OK (US); Doug Whisenhunt, Tulsa, OK (US)

(73) Assignee: Big Elk Energy Systems, LLC, Tulsa, OK (US)

( * ) Notice: Subject to any disclaimer, the term of this patent is extended or adjusted under 35 U.S.C. 154(b) by 0 days.

(21) Appl. No.: 15/062,614

(22) Filed: Mar. 7, 2016

(51) Int. Cl.
*F16L 3/12* (2006.01)
*F16L 3/00* (2006.01)
*F16L 3/223* (2006.01)
*F16L 3/08* (2006.01)
*H02G 3/30* (2006.01)
*F16L 3/10* (2006.01)
*H02G 3/22* (2006.01)

(52) U.S. Cl.
CPC ...... *F16L 3/12* (2013.01); *F16L 3/00* (2013.01); *F16L 3/223* (2013.01); *F16L 3/08* (2013.01); *F16L 3/10* (2013.01); *H02G 3/22* (2013.01); *H02G 3/30* (2013.01)

(58) Field of Classification Search
CPC ... F16L 3/12; F16L 3/137; F16L 3/223; F16L 3/233; F16L 3/24; F16L 3/00; F16L 3/02; F16L 3/08; F16L 3/10; H02G 3/22; H02G 3/30; B66F 5/025; E04F 15/0247; E04G 25/06; F16M 11/046; A47B 91/16; A47B 91/022; A47B 9/04
USPC ........ 248/70, 73, 74.1, 59, 62, 65, 678, 127, 248/131, 146, 158, 161, 415
See application file for complete search history.

(56) References Cited

U.S. PATENT DOCUMENTS

| | | | | |
|---|---|---|---|---|
| 1,303,249 A | * | 5/1919 | Brown ...................... | F16L 3/00 248/70 |
| 2,029,149 A | * | 1/1936 | Barnes ..................... | H01R 4/60 439/777 |
| 2,376,041 A | * | 5/1945 | Ellerthorpe .............. | F16L 3/24 248/72 |
| 4,320,882 A | * | 3/1982 | Bachle .................... | F16L 25/04 248/70 |
| 5,215,283 A | * | 6/1993 | Gould ................ | A47G 29/1216 232/39 |

(Continued)

OTHER PUBLICATIONS

E-Z Line Pipe Support Co., LLC; http://www.ezline.com/uploads/1/2/6/5/12653714/supportconfiguration.pdf (accessed Dec. 30, 2015).

(Continued)

*Primary Examiner* — Nkeisha Smith
(74) *Attorney, Agent, or Firm* — GableGotwals

(57) ABSTRACT

A skid-mounted pipe stand includes a circular-shaped top plate that has least one pair of arcuate-shaped through-slots arranged to each receive a leg of a U-bolt, a threaded stud connected to a bottom side of the top plate, and a vertical support having at its upper end a nut welded to the upper end and sized to receive the threaded stud. A rotation of the top plate moves the top plate between a first vertical position and a second different vertical position. Once the U-bolt is tightened about the component being supported by the stand, vertical movement of the stand is prevented. Any lateral movement is limited to the clearance between the threads of the threaded stud and the nut.

11 Claims, 2 Drawing Sheets

(56) References Cited

U.S. PATENT DOCUMENTS

| | | | | |
|---|---|---|---|---|
| 5,807,017 A * | 9/1998 | Noble | ............... | F16B 7/0493 248/229.1 |
| 6,502,791 B2 * | 1/2003 | Parker | ............... | F16L 3/18 248/405 |
| 6,536,717 B2 * | 3/2003 | Parker | ............... | F16L 3/11 248/346.01 |
| 6,651,940 B2 * | 11/2003 | Hill, Sr. | ............... | B60D 1/62 248/75 |
| 6,679,460 B2 * | 1/2004 | Nicolia | ............... | F16L 3/133 248/316.5 |
| 9,410,296 B2 * | 8/2016 | Tabibnia | ............... | E01C 5/00 |
| 2016/0169442 A1 * | 6/2016 | Storjohann | ............ | F16M 11/24 248/125.2 |

OTHER PUBLICATIONS

Sagebrush Pipeline Equipment; http://www.sagebrushpl.com/.

\* cited by examiner

ADJUSTABLE PIPE STAND

BACKGROUND

This invention relates to pipe stands used in oil and gas field applications such as, but not limited pipe stands used in meter skids, control valve skids, fuel gas skids, and pig launcher or receiver skids which are transported to a field site and permit the meter, control valve, fuel gas, or launcher and receiver components contained on the skid to be aligned with and connected to other pipeline or piping components of the field site.

Prior art pipe stands are either not designed for use on a skid or place the skidded equipment at a fixed position or, if adjustable, not designed to support lateral loads during transport of the skidded equipment. These prior art adjustable pipe stands require multiple bolts or nuts to be repeatedly and equally turned in order to raise or lower the stand to a desired height. During transport, the nuts vibrate and loosen, causing the stand's central stud to rattle in its vertical support or guide tube and move side to side. The clearance between the stud and the tube determines the amount of lateral movement of the stand.

Still other stands, even if adjustable, are limited in the amount of vertical adjustment because of U-shaped heads or saddles that must be oriented in line with the pipe or because of U-bolts which must be inserted into pre-positioned bolt holes of the head which, when the stand is at the right vertical height, might not be in the correct position relative to pipe alignment. Last, none of the prior art stands permit a bottom view inspection of the portion of the pipe resting on the stand by rotation of the top plate.

SUMMARY OF INVENTION

A skid-mounted pipe stand includes a circular-shaped top plate that has least one pair of arcuate-shaped through-slots arranged to receive a U-bolt, a threaded stud connected to a bottom side of the top plate, and a vertical support having at its upper end a threaded hole sized to receive the threaded stud. A rotation of the top plate moves the top plate between a first vertical position and a second different vertical position. Objectives of the invention include providing a pipe stand that (1) is easier to adjust than existing skid-mounted adjustable pipe stands; (2) does not require nut adjustment to adjust the stand's vertical position; (3) prevents movement of the stand's vertical position once the stand's U-bolt is tightened about the skid-mounted component supported by the stand; (4) limits or prevents lateral movement of the stand to thread clearance; (5) provides the lateral support needed for transport of skid-mounted components; (6) permits bottom side inspection of components by rotating the stand into a lower position; and (7) does not compromise vertical position relative to component alignment.

DRAWING ELEMENTS

Figure 1:
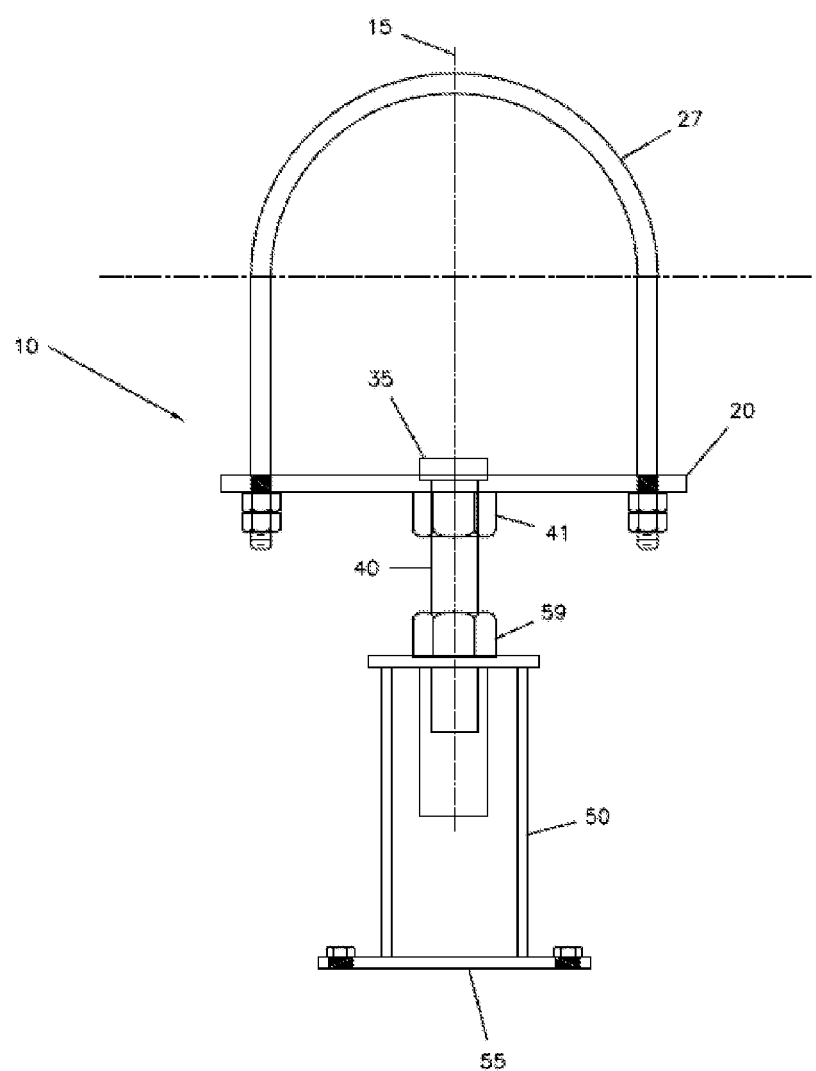
FIG. 1 is a front elevation view of a preferred embodiment of a skid-mounted pipe stand.
Figure 2:
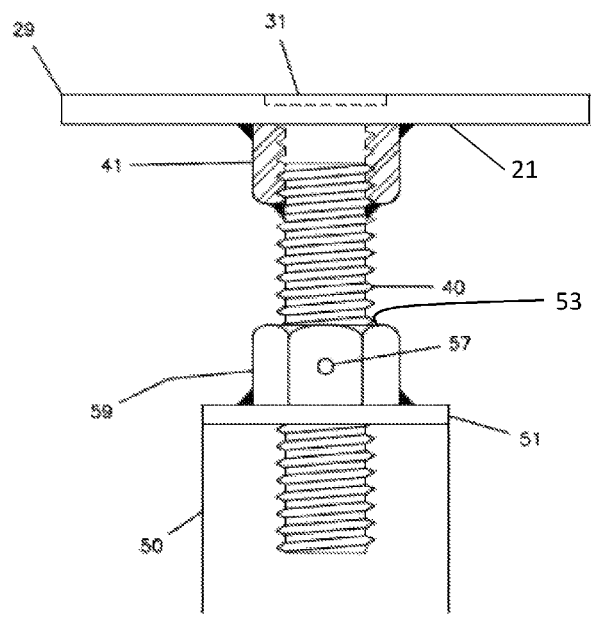
FIG. 2 is a detail view of the threaded stud connected to the top plate and vertical support of FIG. 1.
Figure 3:
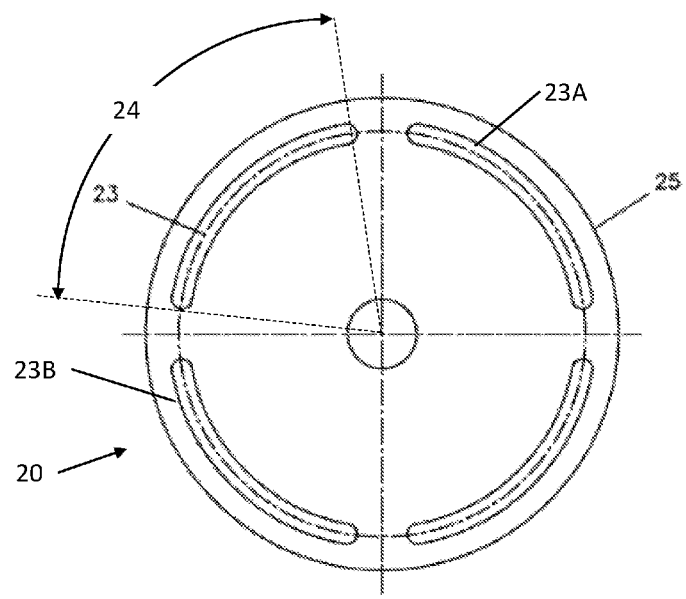
FIG. 3 is a top view of the top plate of FIG. 1.

10 Skid-mounted pipe stand
15 Central longitudinal axis
20 Circular-shaped top plate (head)
21 Bottom side
23 Arcuate-shaped through slot
24 Arc
25 Outer edge
27 U-bolt
29 Top side
31 Circular-shaped recess
35 Isolator or plastic block
40 Threaded stud
41 Upper nut (welded to 21)
50 Vertical support
51 Upper end
53 Threaded hole
55 Lower end
57 Grease fitting
59 Lower nut (welded to 51)

DETAILED DESCRIPTION OF THE PREFERRED EMBODIMENTS

Referring to the drawings, a preferred embodiment of a skid-mounted pipe stand 10 includes a circular-shaped top plate 20, a threaded stud 40 connected to a bottom side 21 of the top plate, and a vertical support 50 having at its upper end 51 a threaded hole 53 sized to receive the threaded stud 30. The top plate 20, threaded stud 40, and vertical support 50 are in coaxial alignment with one another along a central longitudinal axis 15 of the stand 10. A lower end 55 of the vertical support 50 is arranged for connection to a top flange of a skid.

Threaded stud 40 passes through an upper nut 41 (defining threaded hole 53) that is welded to the bottom side 21 of the top plate 20 and a lower nut 59 welded to the upper end 51 of the vertical support 50. During transport, the nuts 41, 59 cannot vibrate or loosen. Therefore, any lateral movement of the stand 10 is limited to the clearance between the threads of stud 40 and nut 59. Additionally, once the U-bolt 27 is tightened about the skid-mounted component supported by the stand 10, rotation of the top plate 20—and therefore vertical movement of the stand 10 is prevented.

As the top plate 20 is rotated clockwise or counterclockwise, it moves between a first vertical position and a second different vertical position. No other vertical adjustment means are necessary to adjust the height of the pipe stand 10. A grease fitting 57 is provided in the stand 50 to help lubricate and maintain the threaded stud 40.

The top plate 20 includes at least one pair of arcuate-shaped through-slots 23A & B, each through-slot 23A & B of the pair being located toward an outer edge 25 of the top plate 20 and opposite the other through-slot 23B & A of the pair. Because of their arcuate shape and length, the slots 23 provide additional degrees of rotation to position the top plate at a correct vertical height yet still receive U-bolts 27 for securing a pipe (not shown) into its correct alignment.

The slots 23 should extend through enough of an arc 24 that permits the top plate 20 to be positioned at a correct vertical height for a pipe or piping component (not shown) yet still receive one or more U-bolts 27 for securing the pipe into its correct axial alignment. For example, the top plate 20 could include two pairs of arcuate-shaped through slots 23, with each slot 23 in its own quarter of the circle extending through a 70° arc 24 (therefore placing each slot 20° apart from the next adjacent slot 23).

To permit bottom side inspection of a pipe, the U-bolt(s) 27 are loosened and top plate 20 is rotated counterclockwise to lower the top plate 20.

The top side 29 of the top plate 20 can include a circular-shaped recess 31 in coaxial alignment with the top plate 20, threaded stud 40, and vertical support 50. The recess 31 receives an isolator or plastic block 35 which has a height greater than that of the recess 31. Preferably, the plastic block 35 is polyethylene block made of TIVAR® ultra-high-molecular-weight polyethylene or its equivalent. This type of polyethylene has appropriate wear and corrosion resistance, self-lubrication, low coefficient of friction, and impact strength.

Block 35 eliminates the need for a coating or plating on the top plate 20. Also, because the block 35 sits above the top side 29 of the plate 20, more of the underside of the supported component is visible for inspection compared to prior art stands.

Typically, multiple pipe stands 10 are included on a skid, which could be a meter skid, control valve skid, fuel gas skid, or pig launcher or receiver skid being transported to a field site. The stands 10 support the components contained on the skid and permit those components to be aligned with and connected to other pipeline or piping components at the field site. A method of adjusting a vertical position of those skid-mounted components for connection to field component includes the step of rotating the top plate to adjust the vertical position of the skid-mounted component.

The following claims define the scope of the invention. Those claims encompass elements equivalent to those specifically recited in the claims.

What is claimed is:

1. A skid-mounted pipe stand comprising:
    a circular-shaped top plate located at an uppermost end of the skid-mounted pipe stand, the circular-shaped top plate including at least one pair of arcuate-shaped through-slots, each through-slot of the pair located toward an outer edge of the top plate and opposite one another, a top side of the top plate including a recess housing a block having a height greater than that of the recess;
    a threaded stud connected to a bottom side of the top plate; and
    a vertical support including at its upper end a nut welded to the upper end and sized to receive the threaded stud;
    the top plate, the recess, the threaded stud, and the vertical support being in coaxial alignment with one another;
    wherein a rotation of the top plate moves the skid-mounted pipe stand between a first vertical position and a second different vertical position.

2. A skid-mounted pipe stand according to claim 1 further comprising a lateral movement of the skid-mounted pipe stand being limited to a clearance between the threaded stud and the nut.

3. A skid-mounted pipe stand according to claim 1 further comprising each through-slot extending through at least a 70° arc.

4. A skid-mounted pipe stand according to claim 1 further comprising the block is a plastic block.

5. A skid-mounted pipe stand according to claim 1 further comprising a grease fitting in communication with the threaded stud.

6. A skid-mounted pipe stand according to claim 1 further comprising a nut welded to the bottom side of the top plate, the nut containing a portion of the threaded stud.

7. A skid-mounted pipe stand comprising:
    a flat top plate located at an uppermost end of the skid-mounted pipe stand, the flat top plate including a central recess housing a block and at least four spaced-apart arcuate-shaped through-slots, each through-slot located toward an outer edge of the flat top plate and extending through an arc of 70°;
    a threaded stud connected to a bottom side of the flat top plate and received by a vertical support having a nut welded at its upper end; and
    the flat top plate, the threaded stud, and the nut being in coaxial alignment with one another, the block having a height greater than that of the central recess;
    wherein a rotation of the flat top plate moves the skid-mounted pipe stand between a first vertical position and a second lower vertical position thereby permitting a bottom inspection of a piping component.

8. A skid-mounted pipe stand according to claim 7 further comprising a lateral movement of the stand being limited to a clearance between the threaded stud and the nut.

9. A skid-mounted pipe stand according to claim 7 further comprising the block is a plastic block.

10. A skid-mounted pipe stand according to claim 7 further comprising a nut welded to the bottom side of the top plate, the nut containing a portion of the threaded stud.

11. A method of inspecting a bottom of a piping component when mounted on a skid-mounted pipe stand, the method comprising the step of:
    removing one or more U-shaped bolts securing a portion of the piping component to a flat top plate of the skid-mounted pipe stand, a bottom of the piping component resting on the flat top plate when secured;
    lowering the skid-mounted pipe stand by rotating the flat top plate; and
    inspecting a bottom end of a portion of the piping component lying opposite the flat top plate;
    wherein the flat top plate includes at least one pair of arcuate-shaped through-slots arranged to receive the U-shaped bolts, each through-slot of the pair located toward an outer edge of the flat top plate and opposite one another;
    a threaded stud connected to a bottom side of the flat top plate; and
    a vertical support including at its upper end a nut welded to the upper end and sized to receive the threaded stud;
    the flat top plate, the threaded stud, and the vertical support being in coaxial alignment with one another.

* * * * *